(12) United States Patent
Al-Harthi et al.

(10) Patent No.: US 8,188,199 B1
(45) Date of Patent: May 29, 2012

(54) METHOD OF PROMOTING OLEFIN POLYMERIZATION

(75) Inventors: Mamdouh Ahmad Al-Harthi, Dhahran (SA); Abdul Kaleel Sulaiman Haniffa, Dhahran (SA); Bijal Kottukkal Bahuleyan, Dhahran (SA); Sadhan Kumar De, Dhahran (SA); Masihullah Jabarulla Khan, Dhahran (SA)

(73) Assignees: King Fahd University of Petroleum & Minerals, Dhahran (SA); King Abdulaziz City for Science & Technology, Riyadh (SA)

( * ) Notice: Subject to any disclaimer, the term of this patent is extended or adjusted under 35 U.S.C. 154(b) by 0 days.

(21) Appl. No.: 13/105,808

(22) Filed: May 11, 2011

(51) Int. Cl.
*C08F 4/02* (2006.01)
*C08F 4/6592* (2006.01)
*B01J 31/22* (2006.01)

(52) U.S. Cl. ........ 526/113; 526/114; 526/160; 526/165; 526/348; 526/943; 502/113; 502/129; 502/152

(58) Field of Classification Search .................. 526/113, 526/114, 160, 165, 348, 943; 502/113, 129, 502/152
See application file for complete search history.

(56) References Cited

U.S. PATENT DOCUMENTS

| 6,649,713 | B2 | 11/2003 | Tang et al. |
| 6,667,360 | B1 | 12/2003 | Ng et al. |
| 2007/0055000 | A1 | 3/2007 | Park |
| 2007/0254107 | A1 | 11/2007 | Rao et al. |
| 2008/0031832 | A1 | 2/2008 | Wakefield et al. |
| 2010/0015437 | A1 | 1/2010 | Grothe et al. |

FOREIGN PATENT DOCUMENTS

WO  WO 2008/117017  10/2008

OTHER PUBLICATIONS

Robin McIntyre et al., "Stabilisation of Polymers Using Micronised Manganese-Doped Titanium Dioxide," High Performance Fillers (2006) Abstract only.
Kemp et al., "Influence of transition metal-doped titanium (IV) dioxide on the photodegradation of polyethylene," Polymer Degradation and Stability, vol. 91 (2006), pp. 3020-3025.
Katrin Scharlach et al., "New Polyolefin Nanocomposites by In Situ Polymerization with Metallocene Catalysts," Macromol. Symp., vol. 261 (2008), pp. 10-17.
Oxonica Materials, 1TD. "Polymer films and coatings", Advertisement for Solacor®, www.oxonica.com/materials/materials_polymers.php(2009), 2 pages.

*Primary Examiner* — Caixia Lu
(74) *Attorney, Agent, or Firm* — Richard C. Litman

(57) ABSTRACT

The method of promoting olefin polymerization uses a nanoparticle filler to increase the activity of a metallocene catalyst for in situ polymerization of polyolefins. The filler may be nanoparticles of manganese, or nanoparticles of manganese-doped titanium dioxide. The method includes the steps of (a) mixing a metallocene catalyst, e.g., zirconocene dichloride, with nanoparticles of the filler in an organic solvent, e.g., toluene, in a reactor to form a reaction mixture; (b) immersing the reactor in a temperature bath for a period of time sufficient to bring the mixture to an optimal polymerization reaction temperature; (c) adding monomer to the mixture in the reactor; (d) adding methylaluminoxane (MAO) as a co-catalyst to the reaction mixture to initiate polymerization; and (e) quenching the polymerization, e.g., by adding methanol containing 5% hydrochloric acid by volume to the reactor.

19 Claims, 4 Drawing Sheets

METHOD OF PROMOTING OLEFIN POLYMERIZATION

BACKGROUND OF THE INVENTION

1. Field of the Invention

The present invention relates to polyolefins, and particularly to a method of promoting olefin polymerization that uses a nanoparticle filler to increase the activity of a metallocene catalyst for in situ polymerization of polyolefins. The filler may be nanoparticles of manganese, or nanoparticles of manganese-doped titanium dioxide.

2. Description of the Related Art

Polyolefins are by far the most common commercial polymers that we encounter in day-to-day life. A number of disadvantages prevent their wider use. Polyethylene is a polymeric material having the largest tonnage in the world with respect to production. Polyethylene possesses valuable properties in addition to its low cost, such as the ability to be recycled, good processability, non-toxicity and biocompatibility. However, due to the inherent chemical nature, both its stiffness and low temperature toughness are not satisfactory. Polymer nanocomposites are a unique new class of materials with an ultrafine dispersion of nanomaterials in a polymeric matrix. They show unique properties by combining the advantages of the inorganic nanofillers (e.g., rigidity, thermal stability) and the organic polymers (e.g., flexibility, dielectric, ductility, and processability). Such inorganic nanoparticles as silicon dioxide ($SiO_2$), titanium dioxide ($TiO_2$), aluminum trioxide ($Al_2O_3$), and zinc dioxide ($ZrO_2$) have been used to improve polymer properties.

A variety of techniques have been used to incorporate such nanosize metal oxide fillers into polymers. For example, the nanoparticles may be mechanically mixed with the polymer resin and blended as a melt in extrusion, injection molding, or other plastics manufacturing processes. However, the melt blending technique does have a major disadvantage, since host-guest incompatibilities usually result in nanoparticle aggregation and phase separation, which is detrimental to the properties of the polymer composite. Solution mixing is another technique that has been used to prepare metal oxide-based polymer nanocomposites, but the process does not suit polyolefins, since the solubility of polyethylene, high-density polyethylene (HDPE), and polypropylene is too low in most low boiling organic solvents. Another problem is the hydrophilic nature of most inorganic fillers and the hydrophobic nature of the polyolefins, which results in weak interfacial adhesion between the filler and the polymer matrix, and in poor mechanical properties.

Thus, a method of promoting olefin polymerization solving the aforementioned problems is desired.

SUMMARY OF THE INVENTION

The method of promoting olefin polymerization uses a nanoparticle filler to increase the activity of a metallocene catalyst for in situ polymerization of polyolefins. The filler may be nanoparticles of manganese, or nanoparticles of manganese-doped titanium dioxide. The method includes the steps of: (a) mixing a metallocene catalyst, e.g., zirconocene dichloride, with nanoparticles of the filler in an organic solvent, e.g., toluene, in a reactor to form a reaction mixture; (b) immersing the reactor in a temperature bath for a period of time sufficient to bring the mixture to an optimal polymerization reaction temperature; (c) adding monomer to the mixture in the reactor; (d) adding methylaluminoxane (MAO) as a co-catalyst to the reaction mixture to initiate polymerization; and (e) quenching the polymerization, e.g., by adding methanol containing 5% hydrochloric acid by volume to the reactor. The nanoparticle filler promotes in situ olefin polymerization with a metallocene/MAO catalyst system, i.e., increases the yield of polyolefin, as evidenced by increased activity of the catalyst as compared to in situ polymerization with a metallocene catalyst in the absence of the nanoparticle filler.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
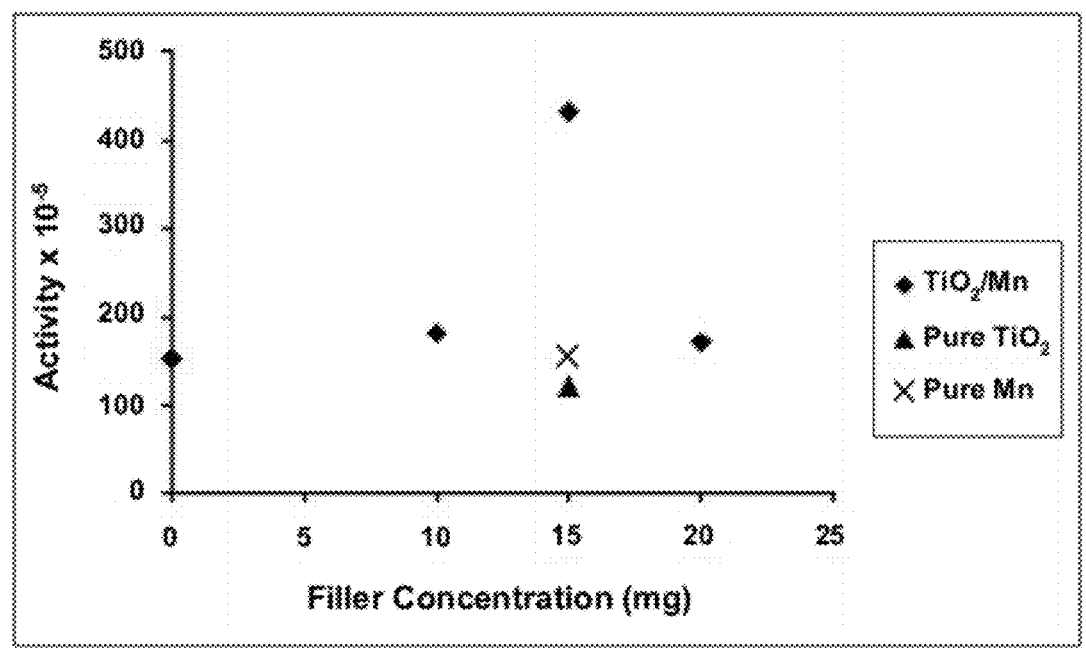
FIG. 1 is a chart of activity vs. filler concentration showing a comparison of a pure titanium dioxide filler to fillers used in a method of promoting olefin polymerization according to the present invention.

The method of promoting olefin polymerization uses a nanoparticle filler to increase the activity of a metallocene catalyst for in situ polymerization of polyolefins. The filler may be nanoparticles of manganese, or nanoparticles of manganese-doped titanium dioxide. The method includes the steps of: (a) mixing a metallocene catalyst, e.g., zirconocene dichloride, with nanoparticles of the filler in an organic solvent, e.g., toluene, in a reactor to form a reaction mixture; (b) immersing the reactor in a temperature bath for a period of time sufficient to bring the mixture to an optimal polymerization reaction temperature; (c) adding monomer to the mixture in the reactor; (d) adding methylaluminoxane (MAO) as a co-catalyst to the reaction mixture to initiate polymerization; and (e) quenching the polymerization, e.g., by adding methanol containing 5% hydrochloric acid by volume to the reactor. The nanoparticle filler promotes in situ olefin polymerization with a metallocene/MAO catalyst system, i.e., increases the yield of polyolefin, as evidenced by increased activity of the catalyst as compared to in situ polymerization with a metallocene catalyst in the absence of the nanoparticle filler.

Example

All manipulations were carried out under $N_2$ using standard Schlenk and glove box techniques. Titanium (IV) dioxide containing Mn as dopant (a nanopowder of $TiO_2$/Mn, the particles having a size less than 100 nm), zirconocene catalyst ($Cp_2ZrCl_2$), and all other chemicals were purchased from Aldrich Chemicals and used without further purification.

Scanning electron microscope (SEM) images were taken by HITACHI S-4200. Transmission electron microscope images were taken by JEOL, JEM 2011 (for high resolution TEM) and HITACHI H-7600.

A series of ethylene polymerizations were performed in a 250 mL round-bottom flask (the reactor) equipped with a magnetic stirrer and a thermometer. The 20.5 μmol of the catalyst (zirconocene dichloride) and the amount of filler for each sample (as specified in Table 1) were added to the flask and the reactor was charged with toluene (80 mL). The reaction mixture was subjected to ultrasonication for 10 minutes. The reactor was immersed in a constant temperature bath previously set to the desired temperature for each sample, as specified in Table 1. When the reactor temperature had been equilibrated to the bath temperature, ethylene was introduced into the reactor after removing nitrogen gas under vacuum. When no more absorption of ethylene into toluene was observed, the 5 mL of the co-catalyst (MAO) was injected into the reactor, and then the polymerization was started. Polymerization was quenched by the addition of methanol containing HCl (5 vol.-%), and then the unreacted monomer was vented. The polymer was washed with an excess amount of methanol and dried in vacuum at 50° C. To make a worthy comparison all data were collected under similar conditions.

The polyethylene nanocomposites were synthesized by in situ polymerization using nanofillers. The characterization was carried out using SEM to understand the morphology of the samples, while TEM was used to determine the dispersion of the nanofillers in polyethylene. The activity of the samples, the morphology trend, and the dispersion will be discussed with respect to filler content, temperature and time.

TABLE 1

Polymerization of polyethylene

| Sample No. | Filler (in mg) | Temp ° C. | Activity | Time (minutes) | $T_m$ ° C. |
|---|---|---|---|---|---|
| 1 | 0 | 30 | 152 | 30 | 132.93 |
| 2 | 10 | 30 | 181 | 30 | 131.34 |
| 3 | 15 | 30 | 431 | 30 | 130.11 |
| 4 | 20 | 30 | 171 | 30 | 130.97 |
| 5 | 15 | 60 | 207 | 30 | 124.8 |
| 6 | 15 | 30 | 121 | 30 | 134.87 |
| 7 | 15 | 30 | 153 | 30 | 133.93 |
| 8 | 15 | 30 | 328 | 120 | 131.73 |

In Table 1, Sample 1 is a control sample of polyethylene prepared with a metallocene catalyst, but with no filler. In Sample 6, the filler is nanoparticles of titanium dioxide without a dopant. In Sample 7, the filler is nanoparticles of manganese, with no titanium dioxide. In all of the remaining samples, the filler is nanoparticles of titanium dioxide doped with manganese. "Temp" is the temperature that was maintained during polymerization by immersion of the reactor in a water bath. "Time" is the duration of polymerization before quenching. "Activity" is the activity of the metallocene catalyst optimized to standard conditions (1 mole of zirconocene, 1.3 bar, and 1 hour of polymerization time), usually expressed in the literature as gPE/mol-Zr h bar. All activities are ×$10^{-5}$. "$T_m$" is the melting point of the sample product.

The samples were prepared with the experimental conditions shown in Table 1. The increase in the concentration of nanofillers from 10 mg to 20 mg showed a distinct trend. The polymerization activity obtained was maximum at a filler concentration of 15 mg, which produced an activity of 431× $10^5$ gPE/mol Zr h bar. An increase in the filler concentration to 20 mg resulted in a decrease in the activity when compared to the 15 mg of filler concentration, but still there is an increase in activity compared to the control. The significant claim is the increase in the activity compared to the control with the incorporation of filler. Optimum nanofiller incorporation at a temperature of 30° C. with a polymerization time of 30 minutes is shown to be around 15 mg from our experiments. An attempt was made to understand the influence of temperature on the polymerization process. At our optimum loading of 15 mg of nanofiller, the reaction was carried out at 60° C. The outcome was a significant reduction in the activity when compared with the activity at 30° C. Thus, increasing the temperature does not play a major role in increasing the activity.

As shown in Table 1, nanoparticles of titanium dioxide doped with manganese acted as the nanofiller. To further understand the role of doped nanotitania, experiments were carried out with both pure titania (Sample 6) and pure manganese (Sample 7). The optimum loading of 15 mg was used for both the runs. FIG. 1 shows a comparison of the activity of the metallocene/MAO catalyst with a filler of manganese-doped titanium dioxide (15 mg) polymerized at 30° C. for 30 minutes (Sample 3) with the activity of the metallocene/MAO catalyst with a filler of the same quantity of pure titania (Sample 6) and of pure manganese (Sample 7) polymerized under the same conditions. Both the titania filler and manganese filler runs showed a marked decrease in the polymerization activity compared to titanium dioxide doped with manganese (15 mg filler incorporated) under the same reaction conditions. This confirms that a nanofiller of titanium dioxide doped with manganese increases the yield by increasing the catalytic activity of the catalyst.

The thermal characteristics of the polyethylene nanocomposites were determined by differential scanning calorimetry. The melting temperatures of PE and PE-coated $TiO_2$/Mn samples were determined by DSC from the second run. PE coated $TiO_2$/Mn from zirconocene catalyst displayed a $T_m$ slightly lower (130° C., Entry 3, Table 1) than that of polyethylene obtained in the absence of filler, as indicated from Table 1 (132° C., Sample 1, Table 1). From this we can infer that the enhancement of activity is achieved without affecting the thermal property of the polymer to a great extent.

Figure 2:
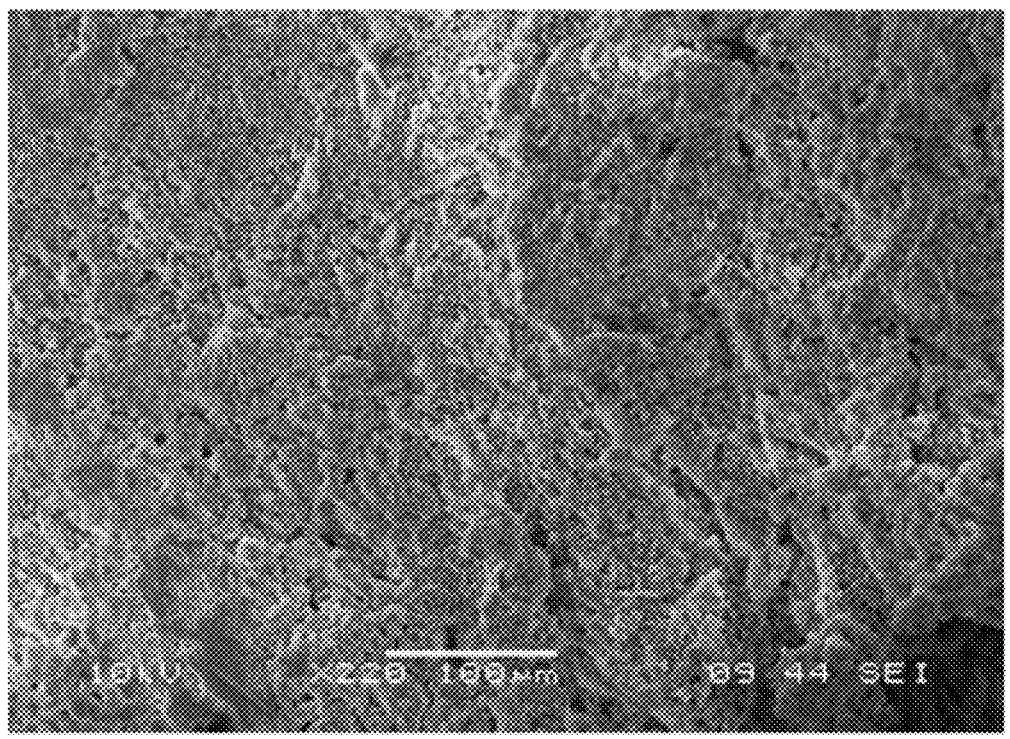
FIG. 2 is a scanning electron microscopy (SEM) micrograph of a polyethylene control made without filler.
Figure 3:
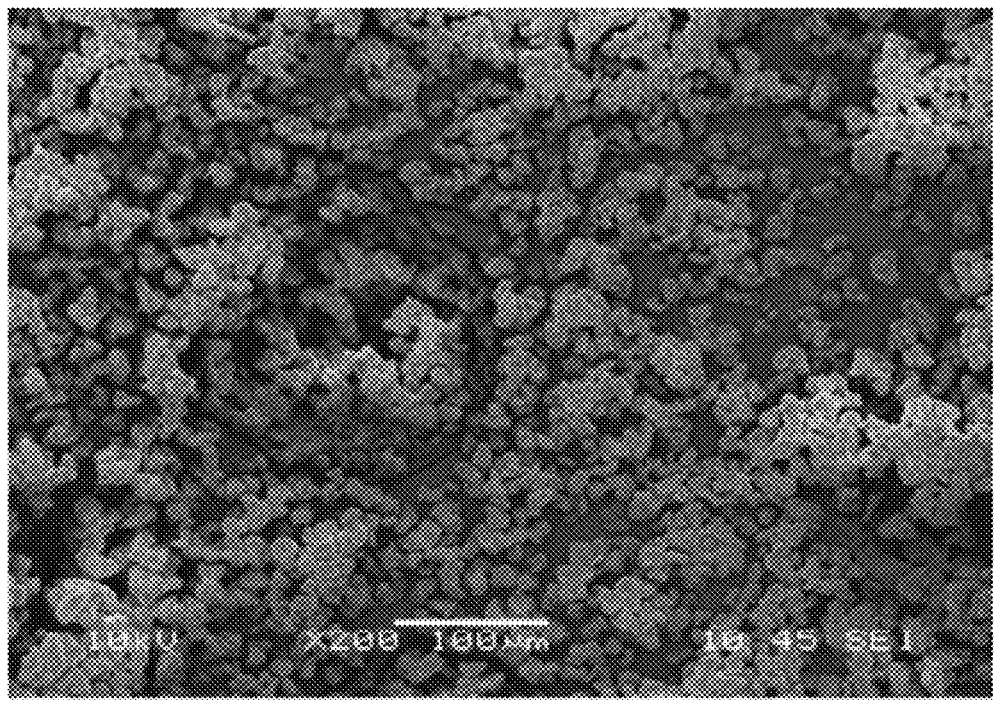
FIG. 3 is a scanning electron microscopy (SEM) micrograph of polyethylene made with a filler of manganese-doped titanium dioxide according to a method of promoting olefin polymerization according to the present invention with 30 minutes polymerization time.
Figure 4:
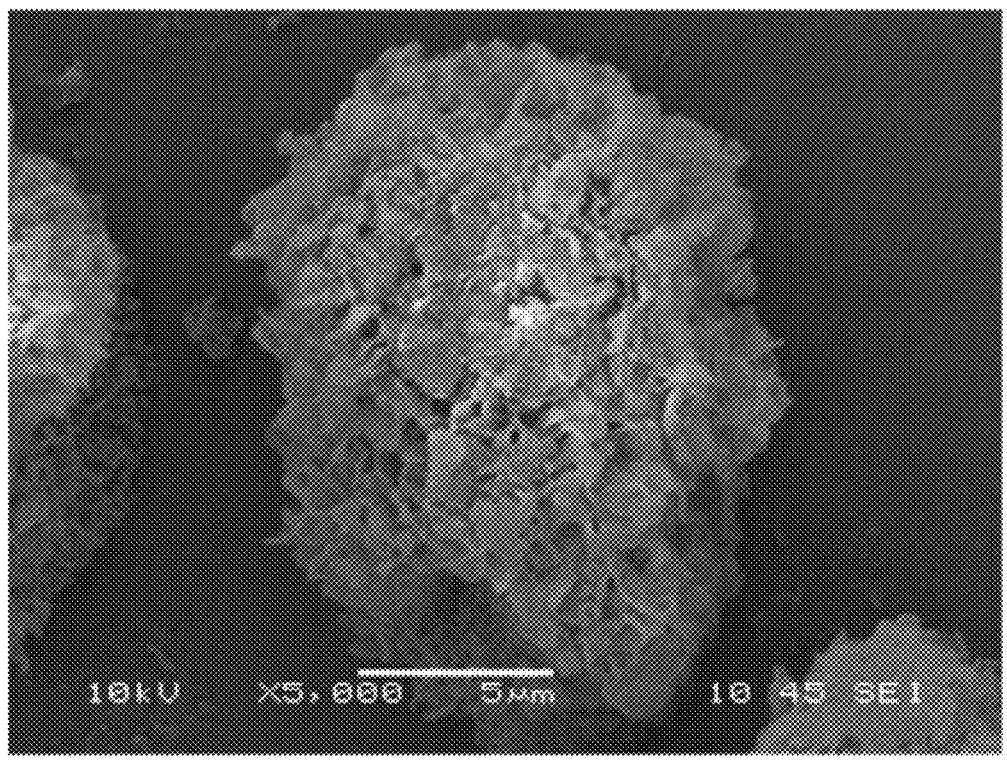
FIG. 4 is a scanning electron microscopy (SEM) micrograph of polyethylene made with a filler of manganese-doped titanium dioxide according to a method of promoting olefin polymerization according to the present invention with 30 minutes polymerization time, but at higher magnification than FIG. 3, showing a single filler particle in the polyethylene matrix.
Figure 5:
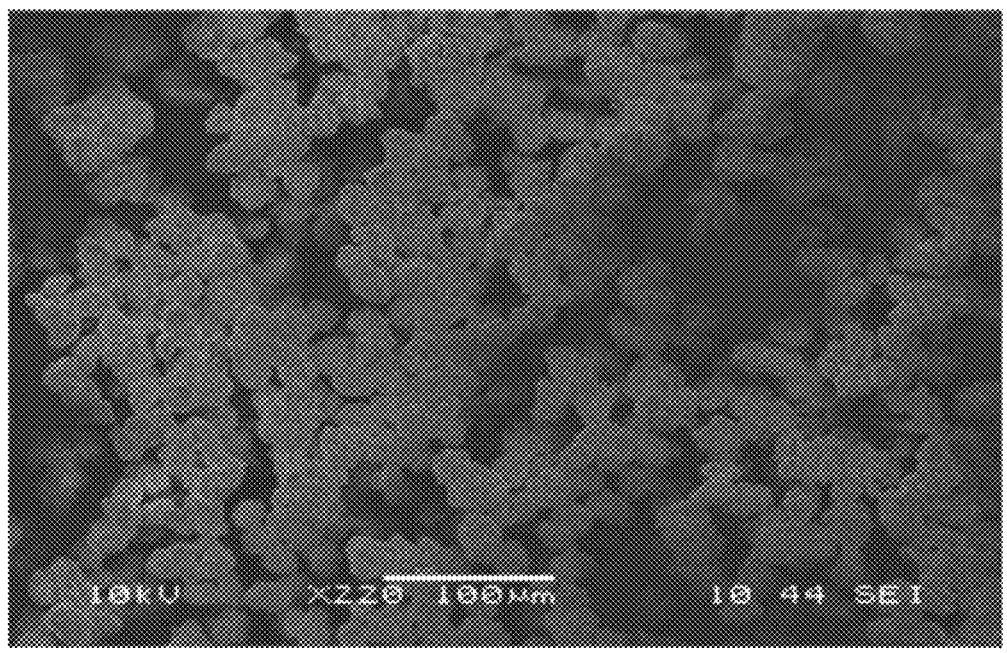
FIG. 5 is a scanning electron microscopy (SEM) micrograph of polyethylene made with a filler of manganese-doped titanium dioxide according to a method of promoting olefin polymerization according to the present invention with 2 hours polymerization time.

The $TiO_2$/PE nanocomposites were further characterized by SEM and TEM to provide further insight into the polymerization process and nanocomposite properties. FIG. 2 represents the SEM micrograph of the control, i.e., polyethylene without any nanofiller loading (Sample 1, Table 1). FIG. 3 shows the SEM micrograph of polyethylene synthesized using 15 mg $TiO_2$ doped with Mn (Sample 3, Table 1), while FIG. 4 shows a closer look at a single particle of filler in the polymer matrix at a different magnification (Sample 3, Table 1). FIG. 5 presents the progressive growth of polyethylene synthesized with a polymerization time of 2 hrs (Sample 8, Table 1). The micrographs clearly show the growth of the polymer, while also showing a good dispersion of the filler in the polymer.

Figure 6:
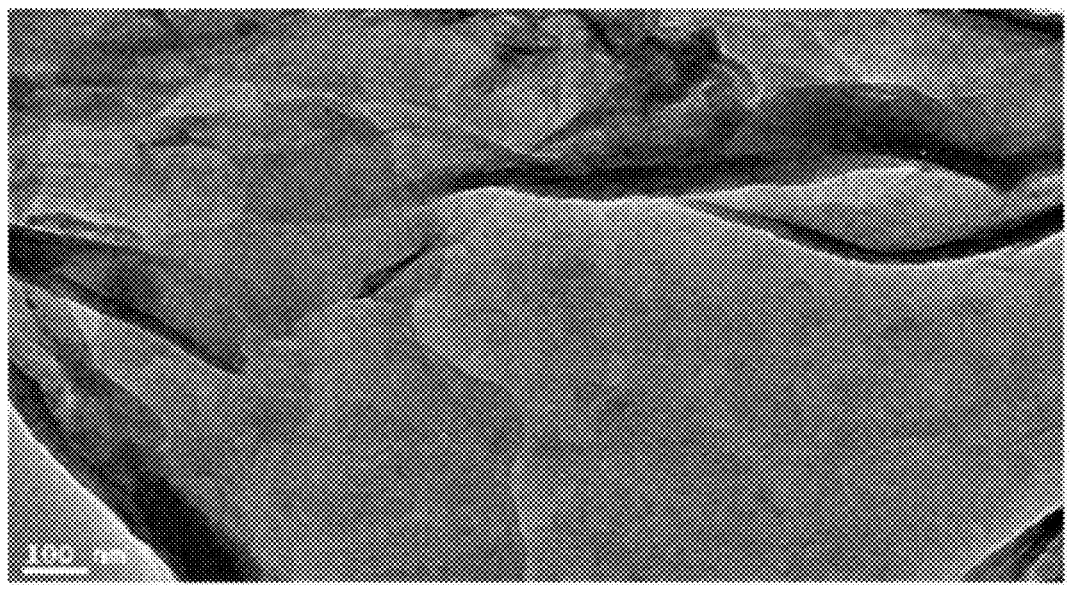
FIG. 6 is a transmission electron microscopy (TEM) micrograph of a polyethylene control made without filler.
Figure 7:
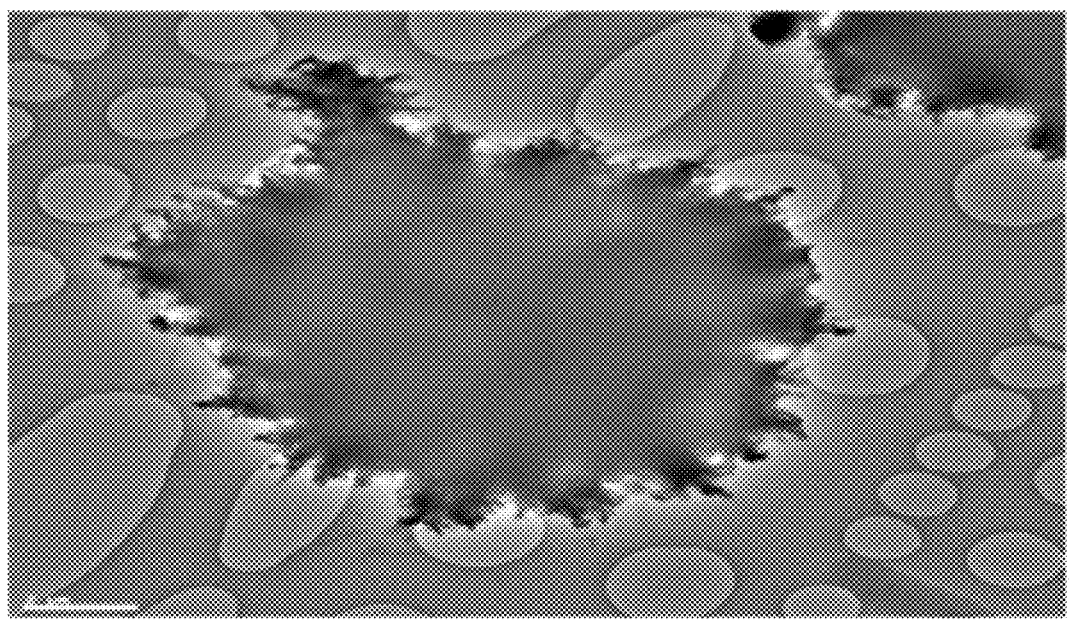
FIG. 7 is a transmission electron microscopy (TEM) micrograph of polyethylene made with a filler of manganese-doped titanium dioxide according to a method of promoting olefin polymerization according to the present invention with 15 mg of filler.

On comparing the TEM images, FIG. 6 represents the TEM micrograph of the control, i.e., polyethylene without any nanofiller loading. FIG. 7 shows the TEM micrograph of polyethylene synthesized using 15 mg TiO2 doped with Mn (Sample 3), representative for the overall material. It is evident from these micrographs that a polyethylene layer, whose thickness increases with time, closely coats the filler.

It will be noted that further experiments were carried out using different substituent groups (e.g., butyl groups and tert-butyl groups in lieu of one or both of the chloride ions) in the zirconocene catalyst. The results showed a similar increase in activity of the catalyst with the manganese-doped titanium dioxide filler. Also, further experiments were carried out at increased pressure (5 bar), the other parameters being the same as Table 1. The results also showed a four-fold increase in the activity of the catalyst with a manganese-doped titanium dioxide filler. It is believed that the method should also be effective for co-polymerization of polymers, whether polar or non-polar.

The present invention relates to a method of promoting olefin polymerization, comprising the steps of: (a) mixing a metallocene catalyst with nanoparticles of manganese-doped titanium dioxide in an organic solvent in a reactor to form a reaction mixture; (b) immersing the reactor in a temperature bath for a period of time sufficient to bring the mixture to an optimal polymerization reaction temperature; (c) adding monomer to the mixture in the reactor; (d) adding methylaluminoxane (MAO) as a co-catalyst to the reaction mixture to initiate polymerization; and (e) quenching the polymerization.

The present invention also relates to the method of promoting olefin polymerization described in the immediately preceding paragraph, wherein the metallocene catalyst comprises zirconocene dichloride. The present invention also relates to the method of promoting olefin polymerization described in the immediately preceding paragraph, wherein the monomer comprises ethylene, the optimal polymerization reaction temperature being about 30° C. The present invention also relates to the method of promoting olefin polymerization described in the immediately preceding sentence, wherein polymerization is continued for a period of about 30 minutes before quenching the polymerization. Alternatively, the present invention also relates to the method of promoting olefin polymerization described above, wherein the monomer comprises ethylene, the optimal polymerization reaction temperature being about 30° C., and wherein polymerization is continued for about two hours before quenching the polymerization. The present invention also relates to the method of promoting olefin polymerization described in the immediately preceding paragraph, wherein said step of quenching the polymerization comprises adding methanol containing 5% hydrochloric acid by volume to the reactor. The present invention also relates to the method of promoting olefin polymerization described in the immediately preceding paragraph, wherein the nanoparticles of manganese-doped titanium dioxide have a particle size less than 100 nm. The present invention also relates to the method of promoting olefin polymerization described in the immediately preceding paragraph, further comprising the step of removing nitrogen from the reactor under vacuum before said step of adding the monomer to the reactor. The present invention also relates to the method of promoting olefin polymerization described in the immediately preceding paragraph, wherein said monomer comprises propylene. The present invention also relates to the method of promoting olefin polymerization described in the immediately preceding paragraph, wherein said step of adding monomer to the mixture in the reactor comprises saturating the solvent with the monomer. The present invention also relates to the method of promoting olefin polymerization described in the immediately preceding sentence, further comprising the step of venting unreacted monomer after the step of quenching the polymerization. The present invention also relates to the method of promoting olefin polymerization described in the immediately preceding paragraph, wherein said metallocene catalyst comprises a zirconocene catalyst having at least one alkyl substituent. The present invention also relates to the method of promoting olefin polymerization described in the immediately preceding paragraph, wherein the polymerization is conducted at a pressure of about 1 bar. The present invention also relates to the method of promoting olefin polymerization described in the immediately preceding paragraph, wherein the polymerization is conducted at a pressure of about 5 bar. The present invention also relates to the method of promoting olefin polymerization described in the immediately preceding paragraph, wherein said step of adding monomer to the mixture in the reactor further comprises adding two different monomers to the reactor for co-polymerization of the monomers.

The present invention also relates to a method of promoting olefin polymerization, comprising the steps of: (a) mixing a metallocene catalyst with nanoparticles of a filler, the filler consisting of manganese, in an organic solvent in a reactor to form a reaction mixture; (b) immersing the reactor in a temperature bath for a period of time sufficient to bring the mixture to an optimal polymerization reaction temperature; (c) adding monomer to the mixture in the reactor; (d) adding methylaluminoxane (MAO) as a co-catalyst to the reaction mixture to initiate polymerization; and (e) quenching the polymerization.

The present invention also relates to the method of promoting olefin polymerization described in the immediately preceding paragraph, wherein the metallocene catalyst comprises zirconocene dichloride. The present invention also relates to the method of promoting olefin polymerization described in the immediately preceding paragraph, wherein the monomer comprises ethylene, the optimal polymerization reaction temperature being about 30° C. The present invention also relates to the method of promoting olefin polymerization described in the immediately preceding sentence, wherein polymerization is continued for a period of about 30 minutes before quenching the polymerization.

It is to be understood that the present invention is not limited to the embodiments described above, but encompasses any and all embodiments within the scope of the following claims.

We claim:

1. A method of promoting olefin polymerization, comprising the steps of
   (a) mixing a metallocene catalyst with nanoparticles of manganese-doped titanium dioxide in an organic solvent in a reactor to form a reaction mixture;
   (b) immersing the reactor in a temperature bath for a period of time sufficient to bring the mixture to an optimal polymerization reaction temperature;
   (c) adding monomer to the mixture in the reactor;
   (d) adding methylaluminoxane (MAO) as a co-catalyst to the reaction mixture to initiate polymerization; and
   (e) quenching the polymerization.
2. The method of promoting olefin polymerization according to claim 1, wherein the metallocene catalyst comprises zirconocene dichloride.

3. The method of promoting olefin polymerization according to claim 1, wherein the monomer comprises ethylene, the optimal polymerization reaction temperature being about 30° C.

4. The method of promoting olefin polymerization according to claim 3, wherein polymerization is continued for a period of about 30 minutes before quenching the polymerization.

5. The method of promoting olefin polymerization according to claim 3, wherein polymerization is continued for about two hours before quenching the polymerization.

6. The method of promoting olefin polymerization according to claim 1, wherein said step of quenching the polymerization comprises adding methanol containing 5% hydrochloric acid by volume to the reactor.

7. The method of promoting olefin polymerization according to claim 1, wherein the nanoparticles of manganese-doped titanium dioxide have a particle size less than 100 nm.

8. The method of promoting olefin polymerization according to claim 1, further comprising the step of removing nitrogen from the reactor under vacuum before said step of adding the monomer to the reactor.

9. The method of promoting olefin polymerization according to claim 1, wherein said organic solvent comprises toluene.

10. The method of promoting olefin polymerization according to claim 1, wherein said monomer comprises propylene.

11. The method of promoting olefin polymerization according to claim 1, wherein said step of adding monomer to the mixture in the reactor comprises saturating the solvent with the monomer.

12. The method of promoting olefin polymerization according to claim 11, further comprising the step of venting unreacted monomer after the step of quenching the polymerization.

13. The method of promoting olefin polymerization according to claim 1, wherein the polymerization is conducted at a pressure of about 1 bar.

14. The method of promoting olefin polymerization according to claim 1, wherein the polymerization is conducted at a pressure of about 5 bar.

15. The method of promoting olefin polymerization according to claim 1, wherein said step of adding monomer to the mixture in the reactor further comprises adding two different monomers to the reactor for co-polymerization of the monomers.

16. A method of promoting olefin polymerization, comprising the steps of:
   (a) mixing a metallocene catalyst with nanoparticles of a filler, the filler consisting of manganese, in an organic solvent in a reactor to form a reaction mixture;
   (b) immersing the reactor in a temperature bath for a period of time sufficient to bring the mixture to an optimal polymerization reaction temperature;
   (c) adding monomer to the mixture in the reactor;
   (d) adding methylaluminoxane (MAO) as a co-catalyst to the reaction mixture to initiate polymerization; and
   (e) quenching the polymerization.

17. The method of promoting olefin polymerization according to claim 16, wherein the metallocene catalyst comprises zirconocene dichloride.

18. The method of promoting olefin polymerization according to claim 16, wherein the monomer comprises ethylene, the optimal polymerization reaction temperature being about 30° C.

19. The method of promoting olefin polymerization according to claim 18, wherein polymerization is continued for a period of about 30 minutes before quenching the polymerization.

* * * * *